Nov. 8, 1949   J. S. HASBROUCK   2,487,439
AUTOMATICALLY VARIABLE SPEED SCAVENGE PUMP DRIVE
Filed Feb. 4, 1947
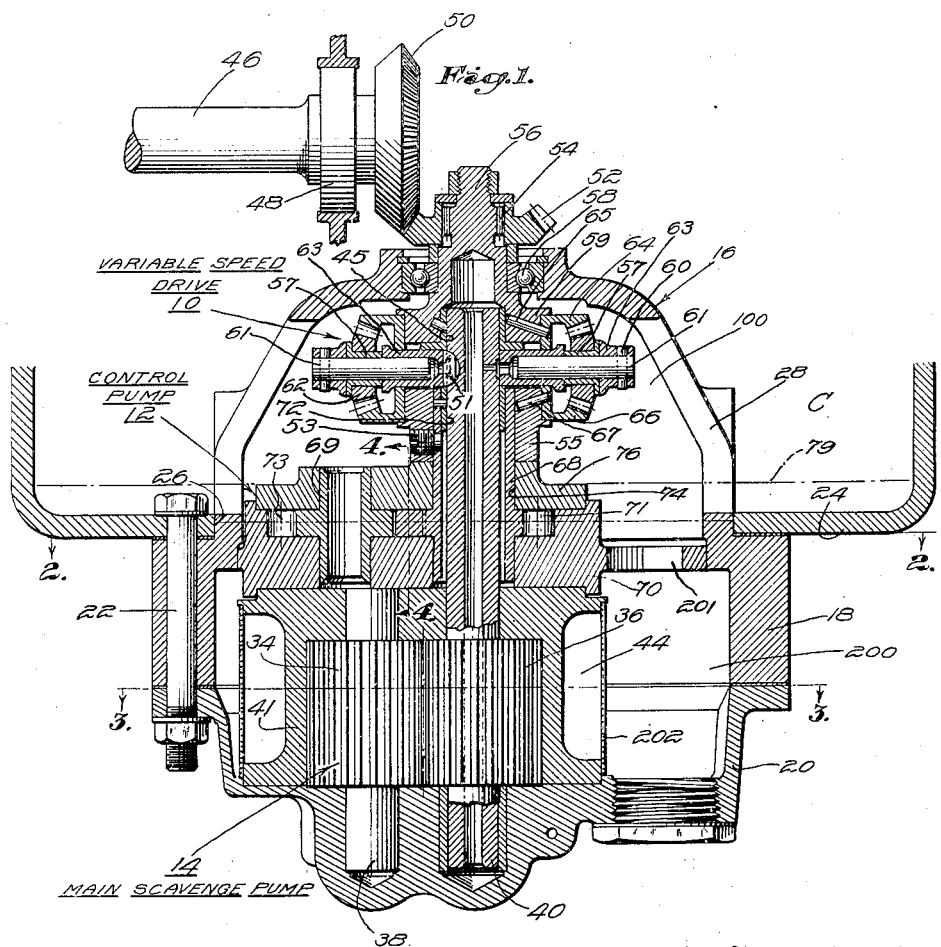
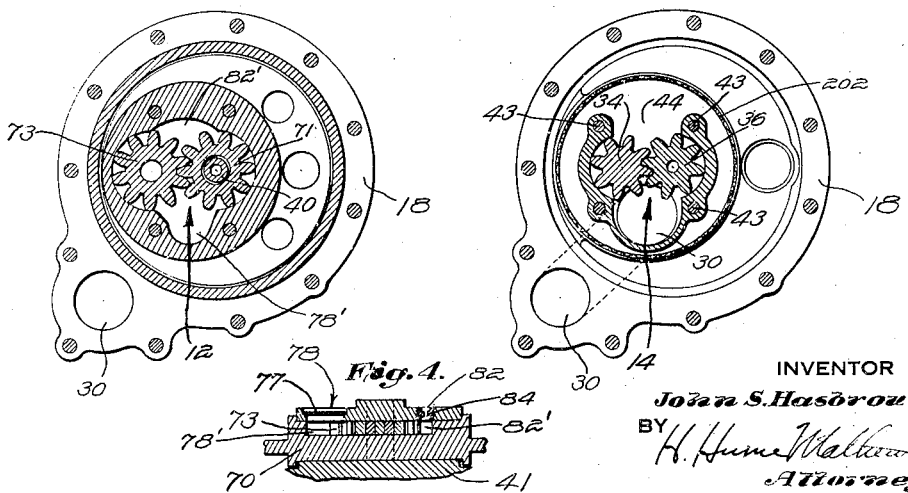
INVENTOR
John S. Hasbrouck
BY
H. Hume Mathews
Attorney Patented Nov. 8, 1949

2,487,439

UNITED STATES PATENT OFFICE 2,487,439

AUTOMATICALLY VARIABLE SPEED SCAVENGE PUMP DRIVE

John S. Hasbrouck, Glastonbury, Conn., assignor to United Aircraft Corporation, East Hartford, Conn., a corporation of Delaware Application February 4, 1947, Serial No. 726,427

6 Claims. (Cl. 103—11)

This invention relates to a pumping apparatus which is particularly adapted for scavenging oil in aircraft engines.

An object of this invention is to provide improvements in a scavenge oil pumping apparatus of the type disclosed in the application of Albert M. Rockwell, Serial No. 726,314, filed February 4, 1947.

Another object is to provide improved means for preventing aeration of the oil in an engine lubricating system.

Another object is to provide an improved apparatus for pumping liquid from a sump in which the capacity of the pumping apparatus is automatically varied in accordance with changes in the level of the liquid in the sump.

Another object is to provide improved means for controlling the speed ratio of a variable speed pump drive.

A further object is to provide an improved control device for automatically increasing or decreasing the capacity of a pump in accordance with variations in pumping requirements.

Other objects and advantages will be apparent from the specification and claims and from the accompanying drawing which illustrates what is now considered to be the preferred embodiment of the invention.

In the drawings, Fig. 1 is a longitudinal cross-sectional view of an aircraft engine scavenge oil pumping apparatus constructed according to the teaching of the present invention.

Fig. 2 is a transverse cross-sectional view on a reduced scale along the line 2—2 in Fig. 1.

Fig. 3 is a view like Fig. 2 but taken along the line 3—3 in Fig. 1.

Fig. 4 is a view like Fig. 2 but taken along the line 4—4 in Fig. 1.

In aircraft engine lubricating systems drain oil usually flows by gravity to a sump and from there it is returned by a scavenge oil pump to the oil tank. Such pumps are made of excessively large capacity, in order to make sure that the drain oil does not exceed a safe level in the sump even under the most adverse operating conditions. Consequently, under most operating conditions, the sumps are kept practically dry and much air is pumped along with the drain oil and becomes mixed therewith. The resulting aeration of the oil is particularly disadvantageous in aircraft engine lubricating systems, and at high altitudes.

According to the present invention a pumping apparatus is provided which may be made large enough in capacity to prevent the liquid in a reservoir, such as an engine drain oil sump, from exceeding a safe level under any operating conditions and which can be automatically adjusted to a lower capacity before the liquid level in the reservoir is reduced to a point where an appreciable amount of air is pumped or mixed with the oil.

In the embodiment of the invention illustrated in the drawing a scavenge pump is driven at a variable speed which is automatically regulated in accordance with changes in the level of the oil in the sump. The main pump is of the gear type; its speed is controlled by a reaction device in the form of an auxiliary gear type pump.

Referring to the drawing, a variable speed drive 10, an auxiliary or control pump 12 and a main gear type pump 14 are all housed in a casing 16 comprising a body 18 and a cap 20. The body and cap are fastened together by bolts 22, which also retain the casing in fluid tight engagement with the walls (partially shown at 24) of an engine oil sump. The upper portion of casing 16 projects into the sump through a circular opening 26 in the bottom wall 24.

Drain oil from the engine (not shown) collects in the sump chamber C on the upper side of wall 24 at a rate which varies with changes in engine operating conditions, such as engine speed, altitude, etc. This drain oil flows by gravity into the casing 16 through an entrance opening 28 and then through an opening 201 to the lower pump chamber 200 and through strainer 202 to pump inlet 44 from whence it is pumped by the main gear pump 14 to a conduit 30 (Fig. 3) leading to the engine oil tank. The oil tank and other parts of the engine oil circulating system, such as the pressure pump and pressure oil distributing passages, have not been shown because they are of conventional design.

Main scavenge pump 14 comprises two gears 34, 36 fixed respectively to parallel shafts 38, 40 rotatably mounted at their lower ends in bearings in the cap 20 and at their upper ends in bearings in a housing or pump case 41. This housing is fastened to cap 20 by bolts 43 (Fig. 3). Rotation of shaft 40 causes both of the gears 34, 36 to rotate and to pump oil from chamber 200 through the main pump inlet 44 to the outlet conduit 30, at a flow rate dependent upon the speed of rotation of pump gears 34, 36.

The main pump is driven through a variable speed drive 10 by a pump drive shaft 46 which is connected to the engine crankshaft by a gear train, not shown, so that it rotates in bearing 48 at a fixed speed relative to engine speed. A bevel gear 50 fixed to shaft 46 meshes with a bevel pinion 52 splined at 54 to a stub shaft 56. The stub shaft extends through the top of casing 16 and is supported by a ball bearing 58 in an opening in the top of the casing. It is integral with a cup or hub member 59, located within the top portion of the casing. A bevel driving gear 64 is pinned at 65 to hub 59. An annular one piece cage 63 carries a plurality of shafts 61 which support bushings 57 on which planet pinions 62 are rotatably mounted. These planet pinions mesh on their upper sides with the bevel ring drive gear 64, and on their lower sides with a bevel ring reaction gear 66 which is pinned at 67 to a collar 55 which in turn is pinned at 53 to drive shaft 68 of the control pump 12. Shafts 56, 40 and 68 are coaxial, with the upper end of the main pump drive shaft 40 journaled at 45 within the lower end of the stub shaft 56 and with the control pump drive shaft 68 rotatably mounted at 72, 74 on the shaft 40. The cage 63 is keyed at 51 to the main pump shaft 40 and the planet pinion shafts 61 are mounted in radial openings in the cage on axes normal to the axis of shaft 40. The pinion shafts are pinned to the cage at 60. The variable speed drive 10 thus constitutes a planetary or differential gear having a cage 63 for driving the main pump 14 and a reaction gear 66 for driving the control pump 12. The cage and reaction gears are both driven through the bevel ring drive gear 64 and engine driven shaft 46.

The control pump is preferably of the gear type, comprising a pair of intermeshing gears 71, 73 respectively mounted on the shaft 68 and a shaft 69. The lower ends of these two shafts are journaled in a partition 70 extending across the casing 18 just below the bottom wall of the sump. Their upper ends are journaled in a cap piece 76 which is fastened to the partition. The partition and cap cooperate to form a housing or pump case for the gears 71, 73 of the control pump, the gears being located in a recess in the partition underneath the cap. As shown in Figs. 4 and 2, the cap 76 is provided with an inlet passage 78 and an outlet passage 82 for the control pump 12. The inlet openings 78, 82 for these passages both lie in a horizontal plane indicated by the broken line 79. The inlet passage 78 may have a screen or filter 77 therein and the outlet passage 82 has inserted therein a flow restriction or orifice 84 of predetermined size and flow capacity.

With this arrangement, oil flows by gravity into the inlet 78 of the control pump whenever the oil in the sump is above the level indicated at 79. But when the oil in sump chamber C is lowered (by pump 14) so that it is near or below the level of line 79 then a mixture of oil and air, or air alone, is admitted through the inlet 78 to the pump 12. The load, or discharge pressure, on the control pump is determined by the flow characteristics of restriction 84 and the nature or condition of the fluid admitted to the pump through inlet 78. Thus, when the oil level in the sump is high and oil only is admitted to the control pump the load thereon is much greater than when the oil level in the sump is so low that air only, or mixtures or slugs of air and oil, flow through the pump inlet 78.

The reaction created by the control pump 12 (or the torque required to drive it) is transmitted between the pump and the reaction gear 66 through shaft 68 and collar 55. Consequently the reaction or braking effect of the gear 66 is a function of the load on pump 12, which in turn is determined by the level of the oil in the sump and the characteristics of the flow restriction 82. A change in oil level which alters the load on the control pump will, therefore, vary the speed of rotation of the reaction gear 66 and thereby alter the speed ratio of the planetary drive so as to change the speed of the main scavenge pump 14. The arrangement is such that when the oil is below the predetermined level 79 the main pump 14 is decreased in speed, and therefore in capacity. When the oil is above this predetermined level the main pump is increased in speed and capacity. Under any conditions, oil only is admitted to the main pump as long as any oil is present in the sump because the entrance opening 28 extends to the bottom wall of the sump and the chamber 200 is located below this bottom wall.

*Operation*

When the engine is started, the driving shaft 46 begins to rotate at a predetermined speed relative to engine speed. Assuming the sump C is dry, there will be little or no load on the control pump 12 and consequently shaft 68 and reaction gear 66 will rotate relatively freely and rapidly, thereby reducing the speed of the main gear pump 14 to either zero or a relatively low value.

As the sump begins to fill, oil flows through the openings 28 and 201 and fills the lower pump casing chambers 200. If the sump continues to fill, the oil reaches or exceeds the level 79 and flows into the pump 12 through the inlet opening 78. The resultant increase in discharge pressure (created by oil flow through orifice 84) considerably increases the torque required to drive the control pump and thereby reduces the speed of the reaction gear 66 and increases the speed of cage 63 and the main pump 14. Thus, when the fluid flowing through the control pump inlet 78 is all air the control pump rotates relatively fast and the main pump rotates relatively slow, or is stationary. When the fluid flow through the inlet 78 is all oil then the control pump rotates relatively slow and the main pump relatively fast. Under other conditions, for instance when the oil is at or very near the level 79 or when the inlet fluid is mixed liquid and gas or rapidly alternating liquid and gas, then the control pump and main pump will both be rotated at some intermediate speed, dependent on the relative amounts of liquid and gas flowing through the control pump inlet.

The planetary drive 10, control pump 12 and main pump 14 are preferably so designed that when the oil level in sump C is high (considerably above the level 79 of inlet opening 78) the main pump, which will then be operated at maximum speed, will have sufficient capacity to lower the level of the oil in the sump for any engine operating condition. In other words, the capacity of the pumping apparatus at maximum speed of pump 14 is greater than the maximum inflow of drain oil to sump C. Thus the quantity of oil in the sump can never exceed a predetermined safe limit. But when the quantity of oil in the sump decreases to a level near or below the plane of line 79 then a material quantity of air is admitted through inlet 78 along with the oil and the load on the control pump 12 is relieved, enabling reaction gear 66 to rotate more rapidly and causing the cage 63 and the main pump 14 to be driven more slowly, thereby decreasing the speed and capacity of pump 14 and reducing the rate of oil flow through the pumping apparatus to a value commensurate with pumping requirements.

The automatic variation of pumping capacity with pumping requirements according to the present invention not only tends to eliminate aeration of the lubricating oil but also improves pump stability and efficiency, saves power and provides other advantages of particular importance in aircraft engine lubricating systems.

It is to be understood that the invention is not limited to the specific embodiment herein illustrated and described, but may be used in other ways without departure from its spirit as defined by the following claims.

I claim:

1. In an oil scavenging apparatus for aircraft engines, a scavenge pump, and means including a gear type control pump for regulating the capacity of said scavenge pump, said gear type control pump being arranged to use only a portion of the fluid that flows into said scavenge pump.

2. Means for preventing aeration of the liquid in a liquid circulating system comprising, a liquid container, a pump having an inlet passage communicating with said container for evacuating liquid from said container, means for controlling the rate at which liquid is evacuated from said container by said pump, and means for maintaining a continuous supply of liquid at the point where said scavenge pump inlet passage communicates with said container comprising level detecting means for actuating said controlling means to reduce said rate of evacuation when the quantity of liquid in said container falls below a predetermined amount.

3. In an automatically variable speed pump drive, a planetary transmission having a main pump drive gear and a reaction gear, and means comprising a control pump and a flow restriction connected in series for controlling the speed of the main pump drive gear by varying the braking effect of the reaction gear.

4. In combination, a pair of pumps having inlet passages for respectively receiving fluid from a container at different predetermined levels therein, and a transmission for driving one of said pumps at a speed dependent on the amount of entrained air in the fluid admitted through one of said inlet passages to the other of said pumps.

5. An oil scavenging apparatus for an aircraft engine having a crankshaft comprising, an oil sump, a scavenge pump for withdrawing oil from said sump, a transmission for driving said scavenge pump by said crankshaft, and means including a control pump having inlet and outlet passages communicating with said sump for regulating the speed of said scavenge pump relative to said crankshaft.

6. Apparatus according to claim 5, including a restricted orifice in said control pump outlet passage.

JOHN S. HASBROUCK.

REFERENCES CITED

The following references are of record in the file of this patent:

UNITED STATES PATENTS

| Number | Name | Date |
|---|---|---|
| 2,416,193 | Meyers | Feb. 18, 1947 |

FOREIGN PATENTS

| Number | Country | Date |
|---|---|---|
| 8,177 | Great Britain | 1911 |